US006512443B1

(12) United States Patent
Matsumura et al.

(10) Patent No.: US 6,512,443 B1
(45) Date of Patent: Jan. 28, 2003

(54) LARGE CURRENT FUSE FOR DIRECT COUPLING TO POWER SOURCE

(75) Inventors: Norio Matsumura, Shizuoka (JP); Shigemitsu Inaba, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/573,196

(22) Filed: May 18, 2000

(30) Foreign Application Priority Data

May 18, 1999 (JP) .......................................... 11-136958

(51) Int. Cl.[7] ......................... H01H 85/044; H02B 1/18

(52) U.S. Cl. ....................... 337/189; 337/188; 337/187; 337/161; 361/626; 361/646

(58) Field of Search ................................ 337/158, 159, 337/161, 188, 189, 187, 229, 256, 290; 361/104, 626, 642, 646; 29/623

(56) References Cited

U.S. PATENT DOCUMENTS 5,034,620 A * 7/1991 Cameron ................... 307/10.7
5,643,693 A * 7/1997 Hill et al. ................... 429/121
5,645,448 A * 7/1997 Hill ............................ 439/522
5,748,068 A * 5/1998 Kiyota ....................... 337/208
5,877,609 A * 3/1999 Carter ........................ 320/103
5,886,611 A * 3/1999 Schaller et al. ............. 337/189
6,294,978 B1 * 9/2001 Endo et al. ................. 337/166

FOREIGN PATENT DOCUMENTS

EP 0699565 A2 * 3/1996 ........... B60R/16/04
EP 0884750 A2 * 12/1998 ......... H01H/85/044
JP 11-41751 * 2/1999 ............ H02G/3/16

* cited by examiner

*Primary Examiner*—Anatoly Vortman
(74) *Attorney, Agent, or Firm*—Sughrue Mion, PLLC

(57) ABSTRACT

A large current fuse for direct coupling to a power source which comprises a fuse body 2A electrically connected to a battery post 4*a* of a battery 4 by way of a power source side terminal 5, and a resin case 3A which partially covers the fuse body, is characterized in that the fuse body 3A consists of a power supply terminal plate 6 in a rectangular shape having the power source side terminal connected to one end thereof and at least one connecting terminal plate 8 integrally formed with at least one of both sides of the power supply terminal plate in a longitudinal direction by way of an L-shaped fusible member, the connecting terminal plate being positioned at the same side as the power supply terminal plate with respect to an extension line extending along the other end of the power supply terminal plate so as to shorten a distance D of the large current fuse protruding from the battery, a portion of an outer peripheral edge of the connecting terminal plate being substantially along the extension line.

9 Claims, 11 Drawing Sheets

LARGE CURRENT FUSE FOR DIRECT COUPLING TO POWER SOURCE

BACKGROUND OF THE INVENTION

1. Technical Field to which the Invention Belongs

The present invention relates to a large current fuse for direct coupling to a power source which can be directly coupled to a battery.

2. Related Art

Generally, a battery is mounted inside a body of an automobile as a supply source of electric power, and a large current fuse is electrically connected to a battery post of the battery by way of power source side terminal. An example of general large current fuses is illustrated in FIG. 13.

As shown in FIG. 13, the large current fuse 80 includes a fuse body 83 which connects a first terminal 82 to a power source side terminal 81, and a resin case 84 which covers an outer face of the fuse body 83. The fuse body 83 includes a connecting hole (not shown) formed in one end thereof, a fusible member 85 arranged at an intermediate portion, and a stud bolt 86 which is provided so as to project from the other end thereof. A power source side stud bolt 81*a* provided in the power source side terminal 81 is inserted into the connecting hole, and a nut 87 is screwed onto the power source side stud bolt 81*a*. The fusible member 85 is adapted to fuse by self heating only when an excess current flows. The first terminal 82 is fixed to the stud bolt 86 by screwing a nut 88.

In order to minimize a distance (protruding allowance) d of the large current fuse 80 protruding from an outer face 89*b* of the battery 89 after the large current fuse 80 has been assembled to a battery post 89*a,* the large current fuse 80 is formed in an L-shape so as to extend along the battery 89. A second terminal 90 may be co-clamped to the power source side stud bolt 81*a* of the power source side terminal 81 together with the large current fuse 80.

However, when the large current fuse 80 has been. assembled to the battery post 89, the stud bolt 86 is directed laterally, therefore connecting workability of the first terminal 82 to the large current fuse 80 is deteriorated. Moreover, since the large current fuse 80 is formed in L shape, there is a drawback that the second terminal 90 which is co-clamped to the power source side terminal 81 together with the large current fuse 80 is restricted by a bent portion 80*a* of the large current fuse 80. Although this drawback may be overcome by making a linear part 91*a* of the large current fuse 91 longer as shown in FIG. 14, it has been disadvantageous that the protruding distance d' of the large current fuse 91 becomes longer.

SUMMARY OF THE INVENTION

In view of the above described problems, it is an object of the invention to provide a large current fuse for direct coupling to a power source in which the connecting workability of the first terminal to the large current fuse will be improved and a degree of freedom of the terminal to be co-clamped with the power source side terminal will be enhanced.

In order to attain the above described object, the invention is embodied by a large current fuse adapted to connect a power source side terminal attached to a battery post of a battery to at least one terminal, said fuse comprising:

a fuse body including:

a power supply terminal plate in substantially rectangular shape, one end of said power supply terminal plate being connectable to said battery post; and at least one connecting terminal plate located in a direction perpendicular to a first direction with respect to said power source side terminal plate, said first direction defined by said fuse body elongating from said battery post; and at least one fusible member connecting said power supply terminal plate to said at least one connecting terminal plate, respectively;

wherein an imaginary line extends along the other end of said power supply terminal plate and is substantially perpendicular to said first direction, said at least one connecting terminal plate is positioned at same side as said power supply terminal plate with respect to said imaginary line, and a outer peripheral edge of said connecting terminal plate is substantially along said imaginary line.

The large current fuse for direct coupling to the power source is further characterized in that the connecting terminal plate is positioned on a same plane as the power supply terminal plate so that terminals can be co-clamped to the power source side terminal with the power supply terminal plate, and that the connecting terminal plate has a stud bolt which projects in a direction opposite to a direction of mounting the power source side terminal on the battery post so as to connect the other terminals thereto.

As described above, the large current fuse for direct coupling to the power source is composed of the fuse body and the resin case which partially covers the fuse body. The fuse body consists of the power supply terminal plate in a rectangular shape, and the connecting terminal plate which is integrally formed with at least one side of both sides of the power supply terminal plate in a longitudinal direction thereof by way of the fusible member. The power supply terminal plate and the connecting terminal plate are positioned at the same side with respect to an extension line extending along the other end of the power supply terminal plate, and a portion of an outer peripheral edge of the connecting terminal plate is substantially along the extension line. Therefore, when the large current fuse has been assembled to the battery post, the distance of the large current fuse protruding from the battery becomes shorter than in the conventional example.

As described above, the connecting terminal plate is positioned on the same plane as the power supply terminal plate and has the stud bolt which projects in a direction opposite to a direction of mounting the power source side terminal on the battery post. Therefore, the large current fuse is flat in shape (flat shaped) as compared with the conventional large current fuse. Moreover, even after the large current fuse has been assembled, the stud bolt of the connecting terminal plate projects upward from the above described same plane.

DETAIL DESCRIPTION OF PREFERRED EMBODIMENTS

Now, an embodiment of the invention will be described by way of example with reference to the drawings.

FIGS. 1 to 8 show a first embodiment of the large current fuse for direct coupling to a power source (hereinafter referred to as the large current fuse) according to the invention.

Figure 1:
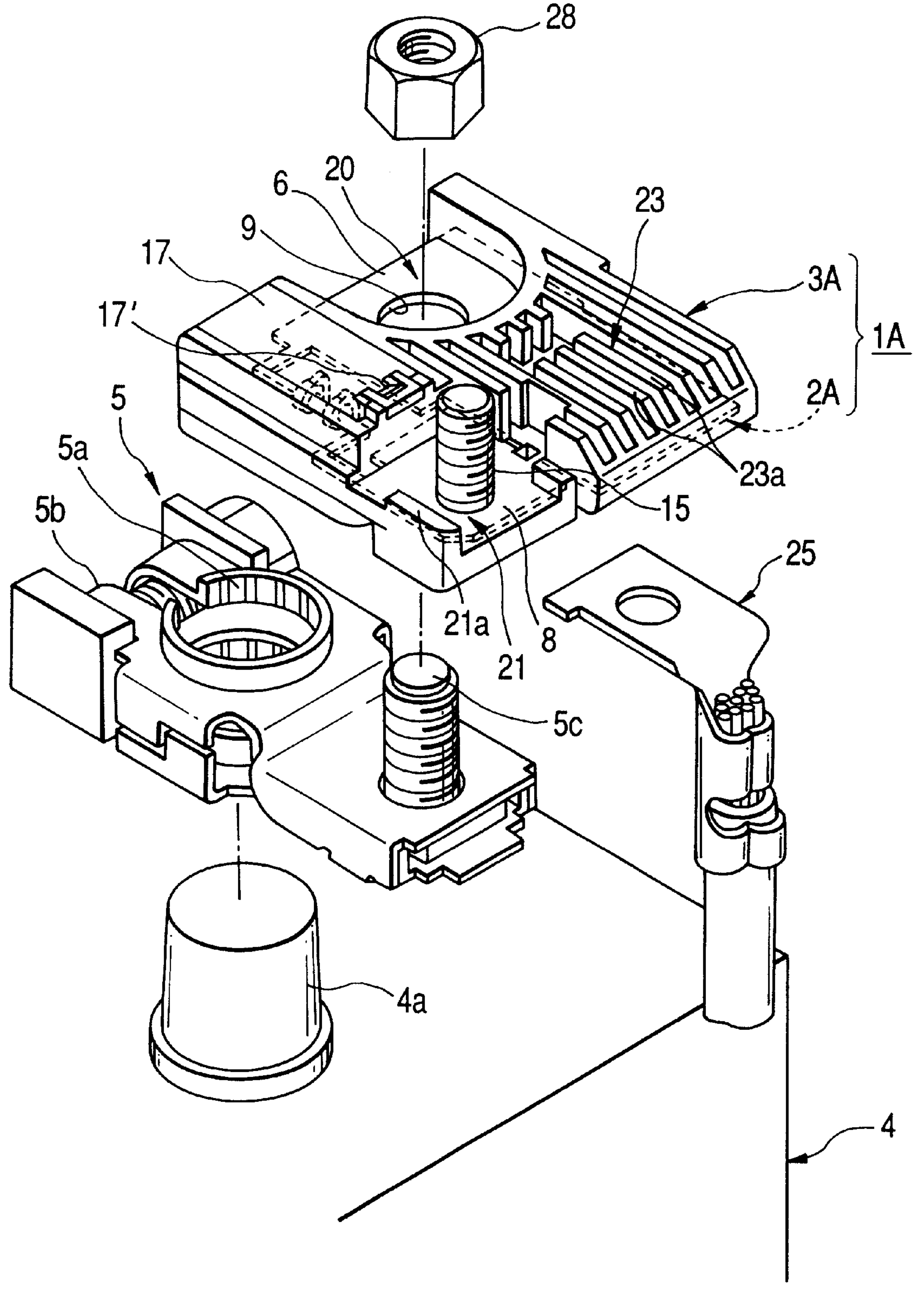
FIG. 1 is an exploded perspective view showing a first embodiment of a large current fuse for direct coupling to a power source according to the invention.

As shown in FIG. 1, this large current fuse 1A includes a fuse body 2A which is electrically connected to a battery post 4*a* of a battery 4 by way of a power source side terminal 5 and a resin case 3A which partially covers the fuse body 2A by resin molding.

Figure 2:
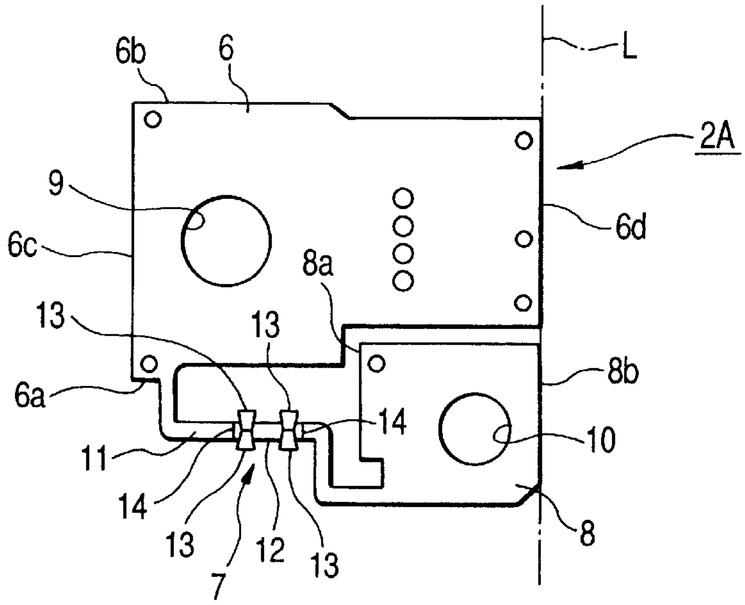
FIG. 2 is a plan view of a fuse body in FIG. 1.

As shown in FIGS. 1 and 2, the fuse body 2A includes a power supply terminal plate 6 in a rectangular shape, and a first connecting terminal plate 8 which is integrally formed with the power supply terminal plate 6 by way of a fusible member 7 at a right side 6*a* of the power supply terminal plate 6 in a longitudinal direction. The case is almost the same also when the first connecting terminal plate 8 is arranged at a left side 6*b* of the power supply terminal plate 6.

The power supply terminal plate 6 is provided with a connecting hole 9 at its one end. The first connecting terminal plate 8 is formed in a rectangular shape and has a bolt hole 10 slightly remote from its center toward its other side 8*b*. The fusible member 7 includes a crank shaped fusible arm 11, a fusing portion 12 formed at an intermediate part of the fusible arm 11, and a pair of caulking pieces 13, 13 provided at both sides of the fusing portion 12 respectively. One end of the fusible arm 11 is connected to the right side 6*a* close to one end 6*c* of the power supply terminal plate 6, and the other end of the fusible arm 11 is connected to one end 8*a* of the first terminal plate 8. Alternatively, the one end of the fusible arm 11 can be connected to an intermediate part of the power supply terminal plate 6 or the right side 6*a* close to the other end 6*d* thereof.

The fusing portion 12 is formed thinner than the fusible arm 11, therefore the fusing portion 12 is fused by self heating when an excess current flows in the large current fuse 1A. A metal chip 14, for example of a metal alloy of tin, lead, etc. is caulked by a pair of the caulking pieces 13, 13.

The power supply terminal plate 6 and the first connecting terminal plate 8 are located at a same side with respect to an extension line L extending along the other end 6*d* of the power source terminal plate 6. Moreover, the power supply terminal plate 6 and the first connecting terminal plate 8 are arranged in such a manner that the other end 8*b* of the first connecting terminal plate 8 extends along the extension line L. In addition, the power supply terminal plate 6 and the first connecting terminal plate 8 are arranged substantially on a same plane.

As shown in FIG. 1, a stud bolt 15 is provided in a bolt hole 10 of the first connecting terminal plate 8 so as to project in an upward direction. The upward direction means a direction opposite to a direction of mounting the power source side terminal 5 on the battery post 4*a*.

Figure 3:
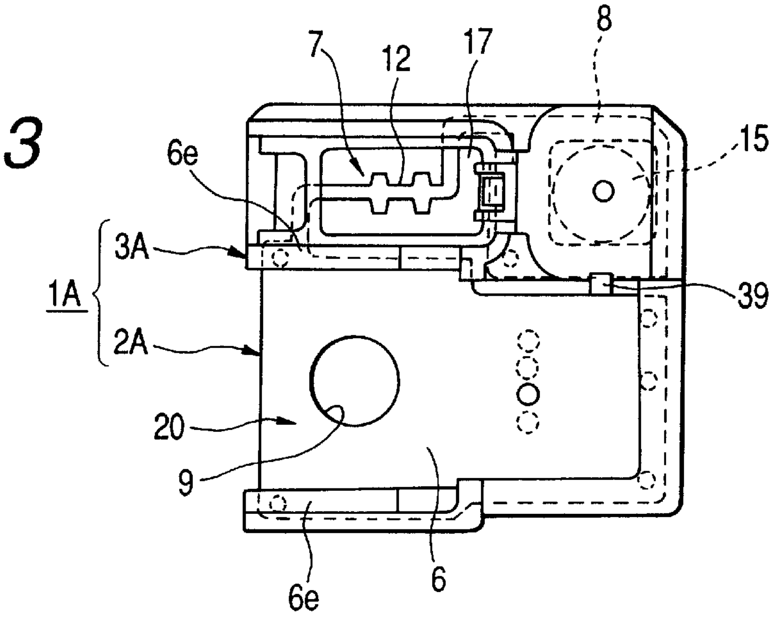
FIG. 3 is a back view of the large current fuse in FIG. 1.

As shown in FIGS. 1 and 3, the resin case 3A partially covers the above described fuse body 2A by resin molding the fuse body 2A. The resin molding is conducted after the stud bolt 15 has been screwed (fixed) into the bolt hole 10 of the first connecting terminal plate 8.

Three part of a surface of the power supply terminal plate 6 between its intermediate portion and the one end 6*c;* a surface of the first connecting terminal plate 8; and a back face of the power supply terminal plate 6 respectively is exposed from the resin case 3A, therefore a power source connecting part 20 and a first terminal connecting part 21 are formed. A surface and a back face of the fusible member 7 are also exposed from the resin case 3A. Transparent covers 17 are provided above the surface and below the back face of the fusible member 7 respectively. The transparent covers 17 are fixed to the resin case 3A by means of locking means 17'. Therefore, the fusible member 7, particularly the fusing portion 12 can be easily checked visually through the transparent covers 17.

On a surface of the resin case 3A, a radiating fin 23 is formed between the intermediate portion and the other end 6*d* of the power supply terminal plate 6. A plurality of thin radiating plates 23*a* constituting the radiating fin 23 are arranged in parallel to a longitudinal direction of the power supply terminal plate 6. In order to form the radiating fin 23 on the resin case 3A, a part of the resin case 3A corresponding to a part of the power supply terminal plate 6 between the intermediate portion and the other end 6*d* must be formed thicker, and therefore, strength (rigidity) of the resin case can be made larger (stronger). Moreover, because a surface area of the resin case 3A can be made larger due to a plurality of the radiating plates 23*a* thus arranged, radiation efficiency can be improved.

On the surface of the resin case 3A corresponding to a periphery of the first terminal connecting part 21, that is, a periphery of the first connecting terminal plate 8, a first positioning rib 21*a* is provided at the resin case 3A in parallel to the above mentioned longitudinal direction.

Figure 4:
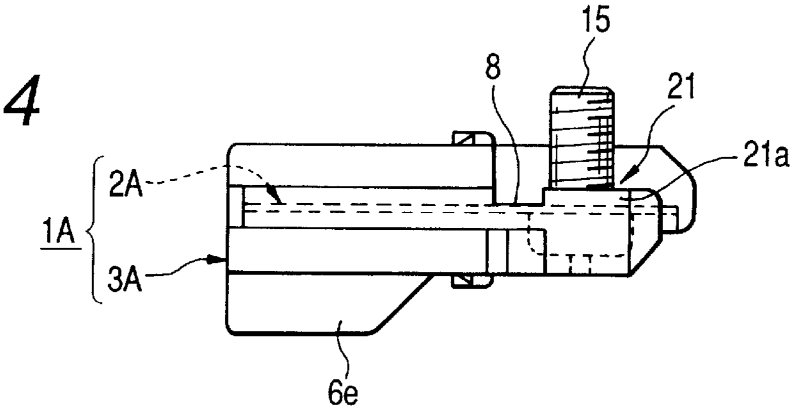
FIG. 4 is a right side view of the large current fuse in FIG. 1.

As shown in FIGS. 3 and 4, a pair of motion preventing ribs 6*e*, 6*e* are provided so as to project from a back face of the resin case 3A in parallel to the longitudinal direction of the power supply terminal plate 6. These motion preventing ribs 6*e* can prevent a co-clamping terminal 26 (26') in FIG. 8 from a lateral slippage (slippage in a direction perpendicular to the above mentioned longitudinal direction).

Reverting to FIG. 1, the power source side terminal 5 includes a caulking bore 5*a*, an adjusting screw 5*b* for adjusting the diameter of the caulking bore 5*a*, and a power source side stud bolt 5*c* to be inserted in the connecting hole 9 of the power supply terminal plate 6.

Referring now to FIG. 1 and FIGS. 5 to 8, a manner of assembling the large current fuse 1A to the battery 4 and a manner of electrically connecting a first terminal 25 and the co-clamping terminal 26 to the large current fuse 1A will be described.

As shown in FIG. 1, the power source side stud bolt 5*c* is inserted into the connecting hole 9 of the large current fuse 1A. Then, a nut 28 is screwed on the power source side stud bolt 5*c* to electrically connect the power source side stud bolt 5*c* to the power source connecting part 20.

Figure 5:
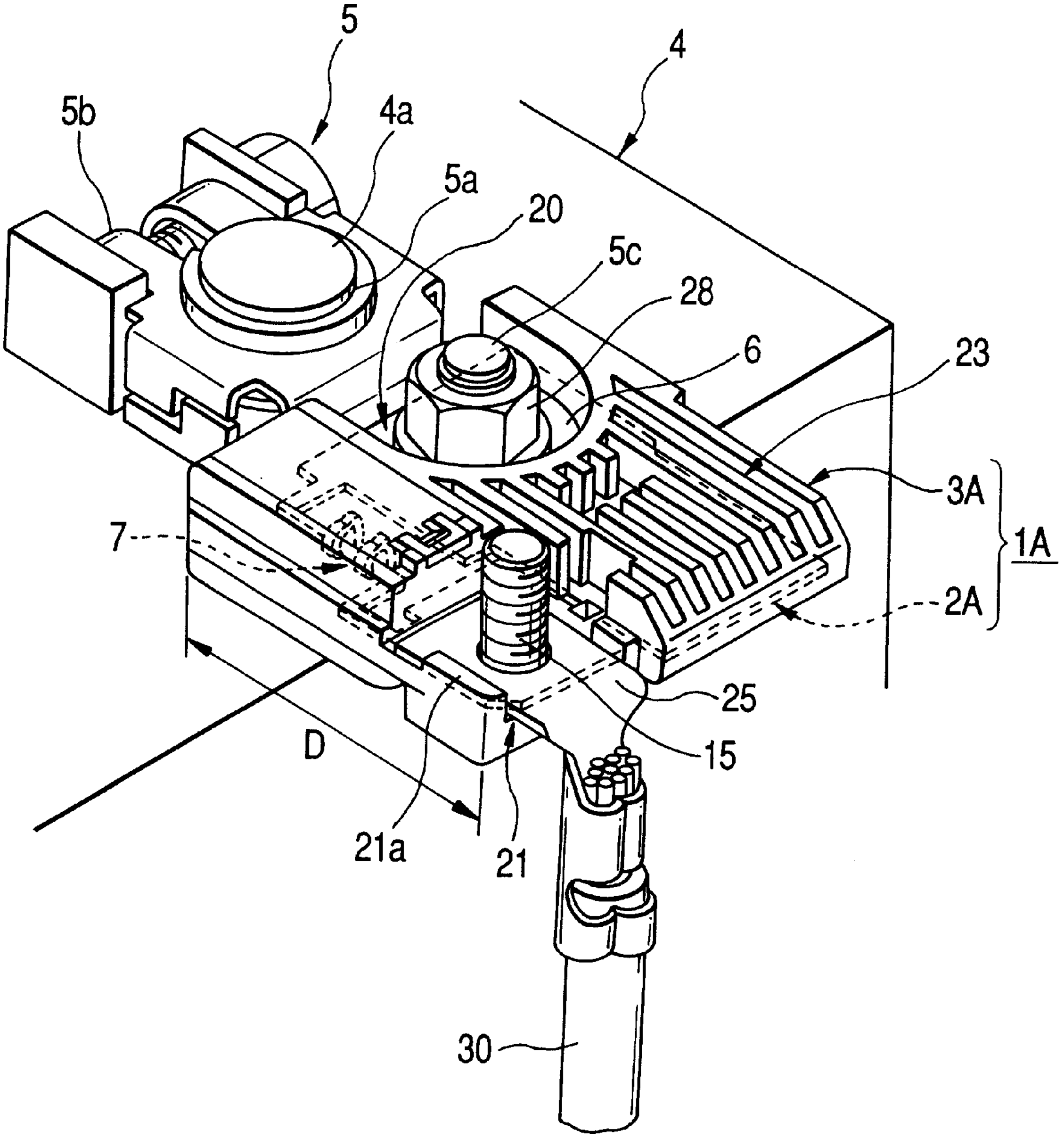
FIG. 5 is a perspective view illustrating a state wherein the large current fuse in FIG. 1 has been assembled to a battery by way of a power source side terminal and a first terminal has been connected thereto.
Figure 6:
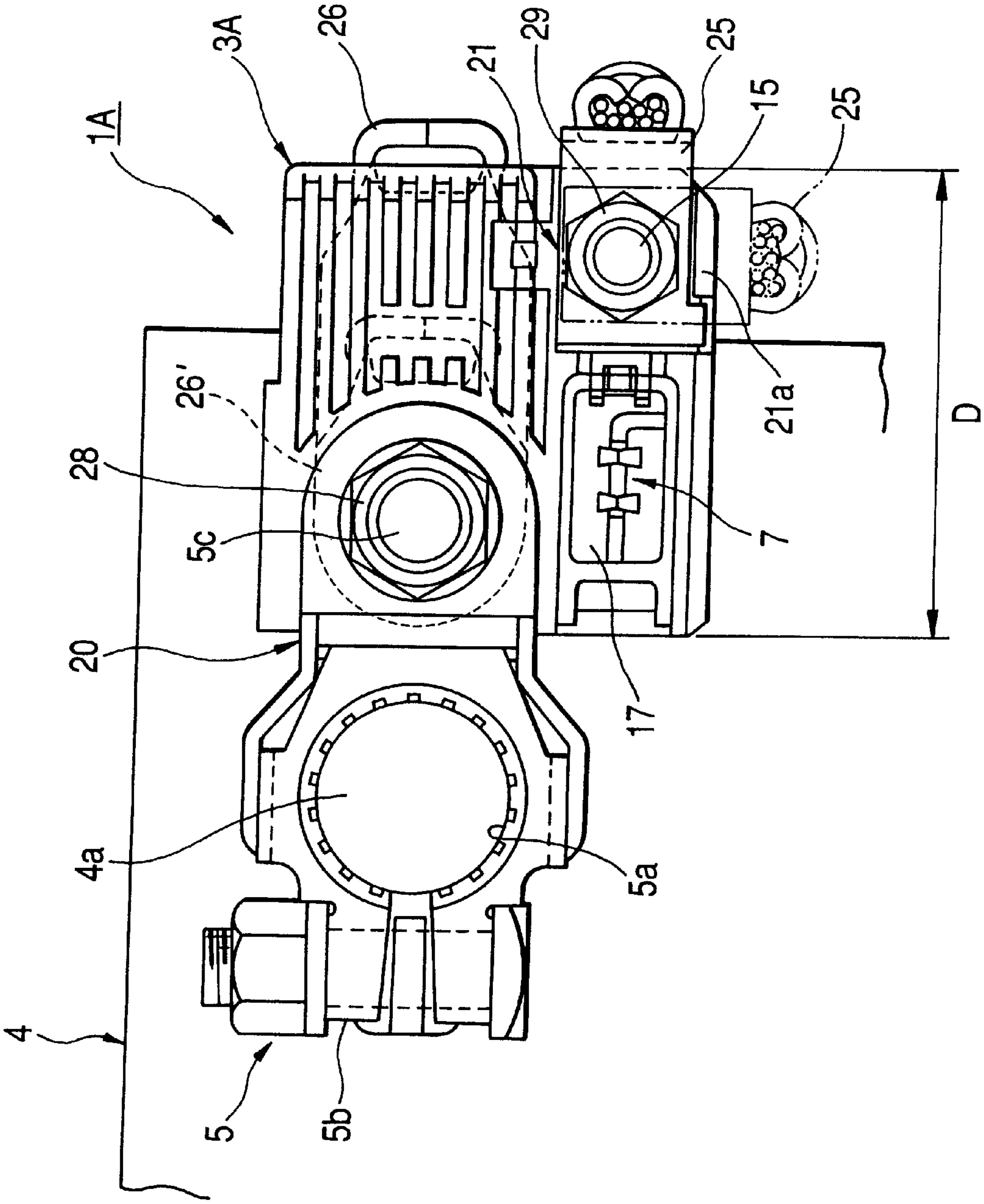
FIG. 6 is a view of the large current fuse in FIG. 5 as seen from the above illustrating a state wherein a co-clamping terminal has been connected thereto.

As shown in FIGS. 5 and 6, the battery post 4*a* is inserted into the caulking bore 5*a* of the power source side terminal 5. The caulking bore 5*a* is decreased in diameter by rotating the adjusting screw 5*b* clockwise or counterclockwise to rigidly fix the power source side terminal 5 to the battery post 4*a*. Thus the large current fuse 1A is assembled (directly coupled) to the battery post 4 by way of the power source side terminal 5. Because the fuse body 2A of the large current fuse 1A is formed in such a shape as described above, the distance D of the large current fuse 1A protruding from the battery 4 after assembled can be made shorter (smaller). Accordingly, on occasion of assembling the large current fuse 1A to the battery 4, a mounting space for the large current fuse 1A can be saved. In addition, even in case where areas surrounding the battery 4 are complicated (crowded), the mounting space for the large current fuse 1A can be amply secured.

Figure 7:
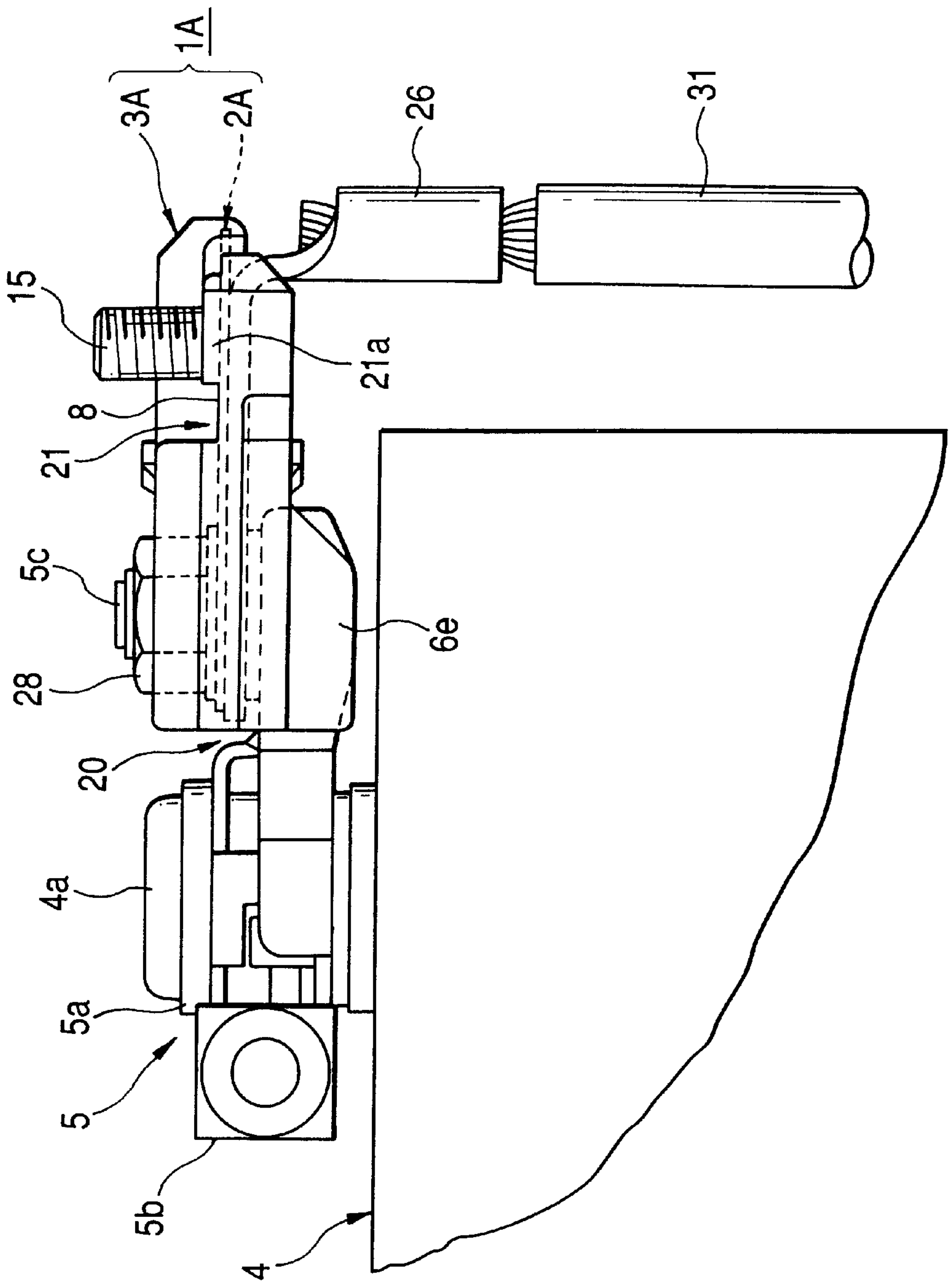
FIG. 7 is a side view of the large current fuse in FIG. 1 illustrating a state wherein a co-clamping terminal has been connected thereto.

As shown in FIGS. 5 and 7, when the large current fuse 1A is assembled to the battery 4, the first terminal connecting part 21 is directed upward (in a direction opposite to the direction of mounting the large current fuse 1A on the battery 4). Accordingly, the stud bolt 15 is also directed upward. The first terminal 25 is connected to an electric wire 30 branched from a non-shown wire harness, and the co-clamping terminal 26 is connected to another electric wire (not shown) which is also branched from the wire harness. The stud bolt 15 is inserted in a connecting hole (not shown) in the first terminal 25, and the first terminal 25 is press fitted to the stud bolt 15. The first terminal 25 which is press fitted is arranged at a determined position by means of the first positioning rib 21*a* of the resin case 3A. The first terminal 25 is electrically connected to the first terminal connecting part 21 by screw fitting a nut 29 to the stud bolt 15. In this state, the connected position of the first terminal 25 is in parallel to the above mentioned longitudinal direction. Because the stud bolt 15 of the large current fuse 1A is directed upward, the first terminal 25 can be easily connected to the large current fuse 1A. As described above, the connecting work can be improved. Particularly, even though the wire harness disposed inside the vehicle has no excess length, the connecting work can be easily performed.

Figure 8:
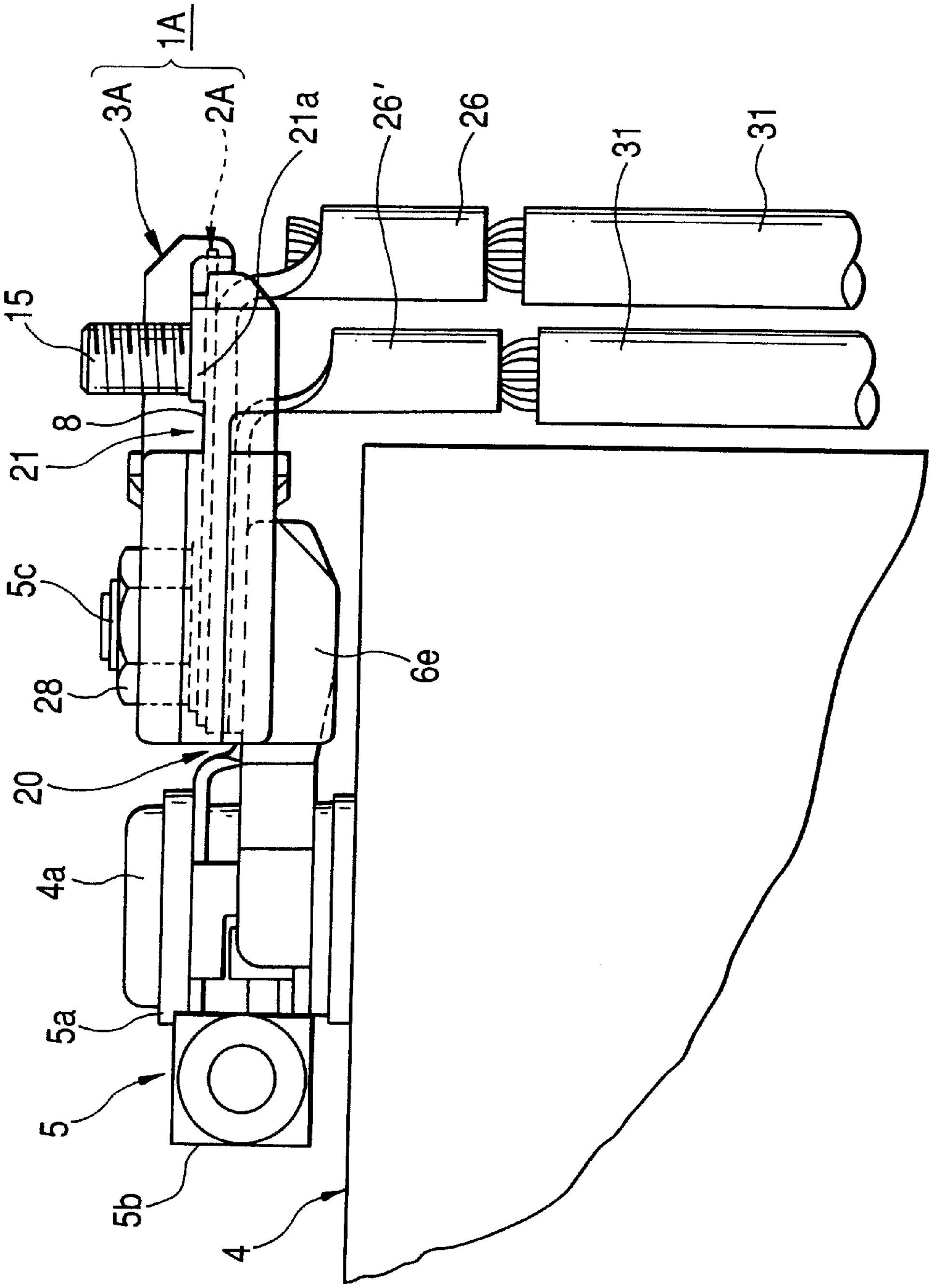
FIG. 8 is a side view of the large current fuse in FIG. 7 illustrating a state wherein co-clamping terminals having different lengths have been connected thereto.

Moreover, because the large current fuse 1A is formed in a rectilinear shape different from the general large current fuse, the co-clamping terminal 26 can be electrically connected to the power source connecting part 20 as shown in FIG. 7 without being restricted due to the shape of the large current fuse 1A. In other words, the large current fuse 1A and the co-clamping terminal 26 can be easily clamped together to the power source side stud bolt 5*c* of the power source side terminal 5. Because the restriction can be abolished by this, the co-clamping terminal 26' having a different length can also be freely connected. Thus, the degree of freedom of connecting the co-clamping terminal 26 (26') which can be coupled together to the power source side terminal 5 can be enhanced as shown in FIG. 8.

For connecting the co-clamping terminal 26 to the power source side stud colt 5*c* of the power source side terminal 5 together with the large current fuse 1A, a connecting hole (not shown) in the co-clamping terminal 26 is mounted on, and next a nut is screwed on the power source side stud bolt 5*c*. On this occasion, the co-clamping terminal 26 is interposed between the power source side terminal 5 and the large current fuse 1A.

Further, by providing the first positioning rib 21*a* of the resin case 3A in a direction perpendicular to the above mentioned longitudinal direction, the first terminal 25 can be connected to the first terminal connecting part 21 of the large current fuse 1A in the direction perpendicular to the longitudinal direction. With this arrangement, a distance D of the large current fuse protruding from the battery 4 inclusive of the first terminal 25 which is connected to the first terminal connecting part 21 can be further shortened.

FIGS. 9 to 12 show a second embodiment of a large current fuse for direct coupling to a power source according to the invention. The same members as in the first embodiment are denoted with the same reference numerals to omit a detailed explanation.

Figure 9:
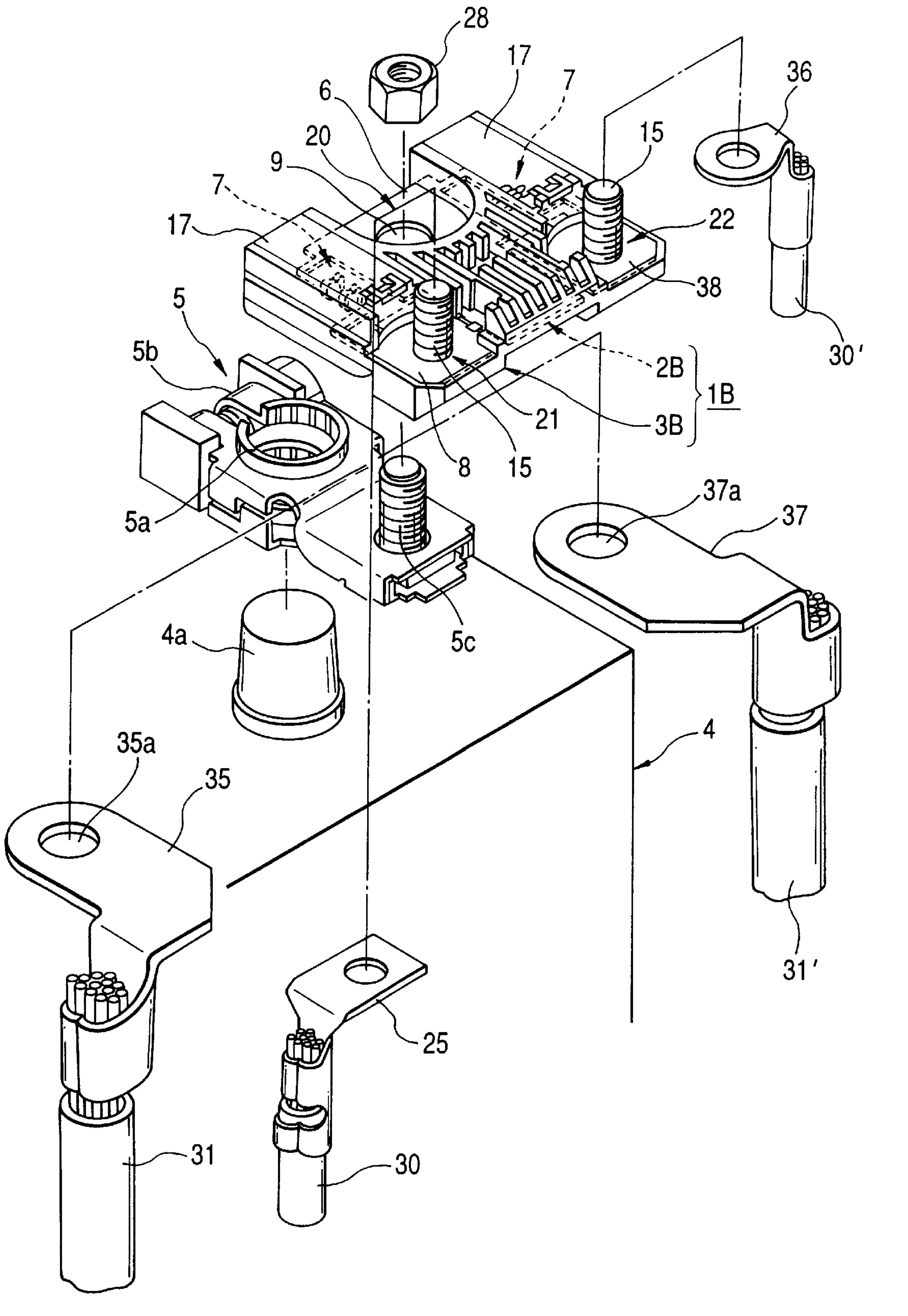
FIG. 9 is an exploded perspective view showing a second embodiment of a large current fuse for direct coupling to a power source according to the invention.

As shown in FIG. 9, this large current fuse lB is composed of a fuse body 2B and a resin case 3B which partially covers the fuse body 2B as in the first embodiment.

Figure 10:
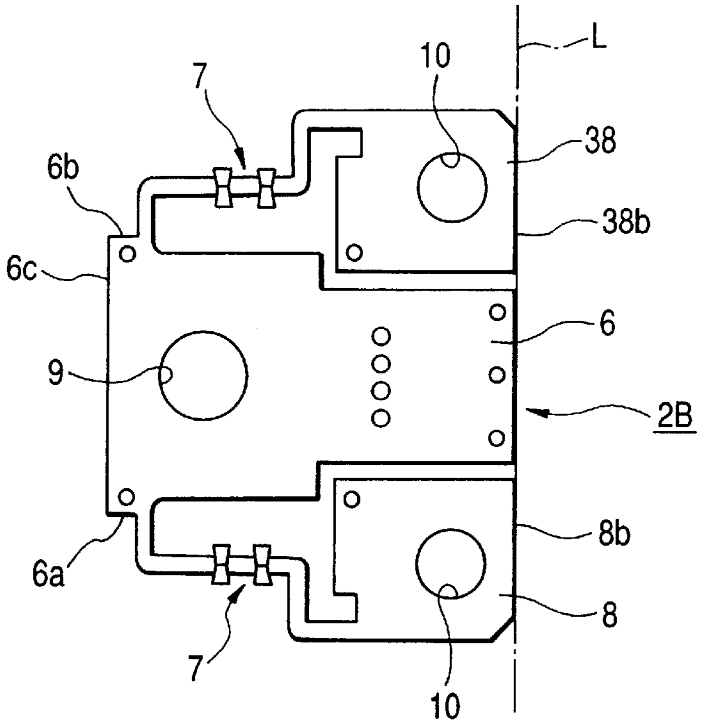
FIG. 10 is a plan view of a fuse body in FIG. 9.

As shown in FIGS. 9 and 10, the fuse body 2B includes a power supply terminal plate 6, a first connecting terminal plate 8 and a second connecting terminal plate 38 which are respectively connected by way of fusible members 7 to both sides 6*a,* 6*b* of the power supply terminal plate 6 in a longitudinal direction. The first connecting terminal plate 8 and the second connecting terminal plate 38 are arranged and constituted symmetrically with respect to the power source terminal plate 6. The power supply terminal plate 6 and the first and the second connecting terminal plates 8, 38 are positioned at the same side with respect to an extension line L of the other end 6d of the power supply terminal plate 6. The other ends 8*b,* 38*b* of the first and the second connecting terminal plates 8, 38 are arranged substantially along an extension line L. All of the power supply terminal plate 6 and the first and the second connecting terminal plates 8, 38 are positioned on a same plane.

Figure 11:
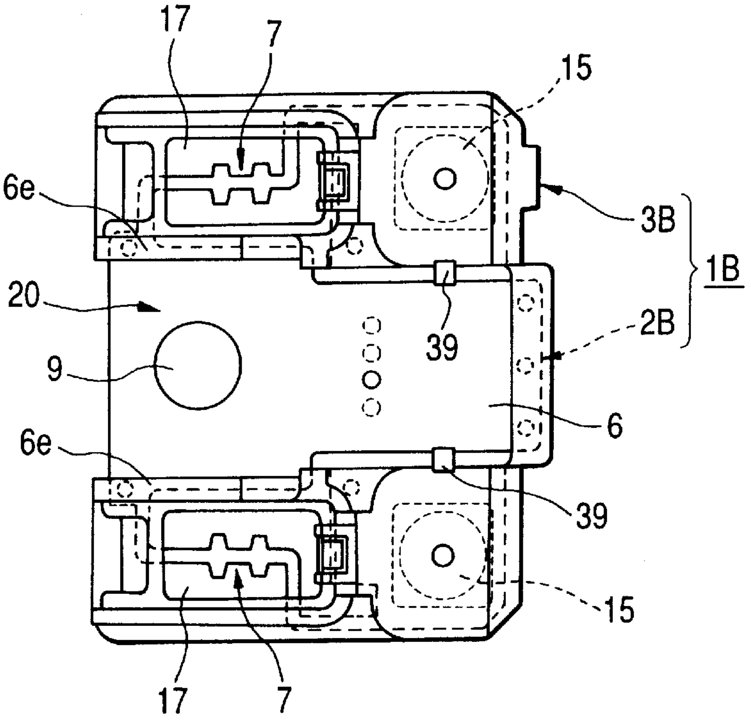
FIG. 11 is a back view of the large current fuse in FIG. 9.

As shown in FIG. 9 and FIG. 11, three parts of a surface of the power supply terminal plate 6 between the intermediate portion and the one end 6*c,* surfaces of the first connecting terminal plate 8 and the second connecting terminal plate 38, and the back face of the power supply terminal plate 6 are exposed from the resin case 3B, therefore a power source connecting part 20, a first terminal connecting part 21, and a second terminal connecting part 22 are respectively formed. The power source connecting part 20, the first terminal connecting part 21, and the second terminal connecting part 22 are respectively in such shapes as to correspond to shapes of counterpart members to be connected. Both the surfaces and the back faces of the fusible members 7 are also exposed. Transparent covers 17 are provided above and below the fusible members 7. A radiating fin 23 is formed on the resin case 3B corresponding to an area of the power supply terminal plate 6 between the intermediate portion and the other end 6*d*.

Figure 12:
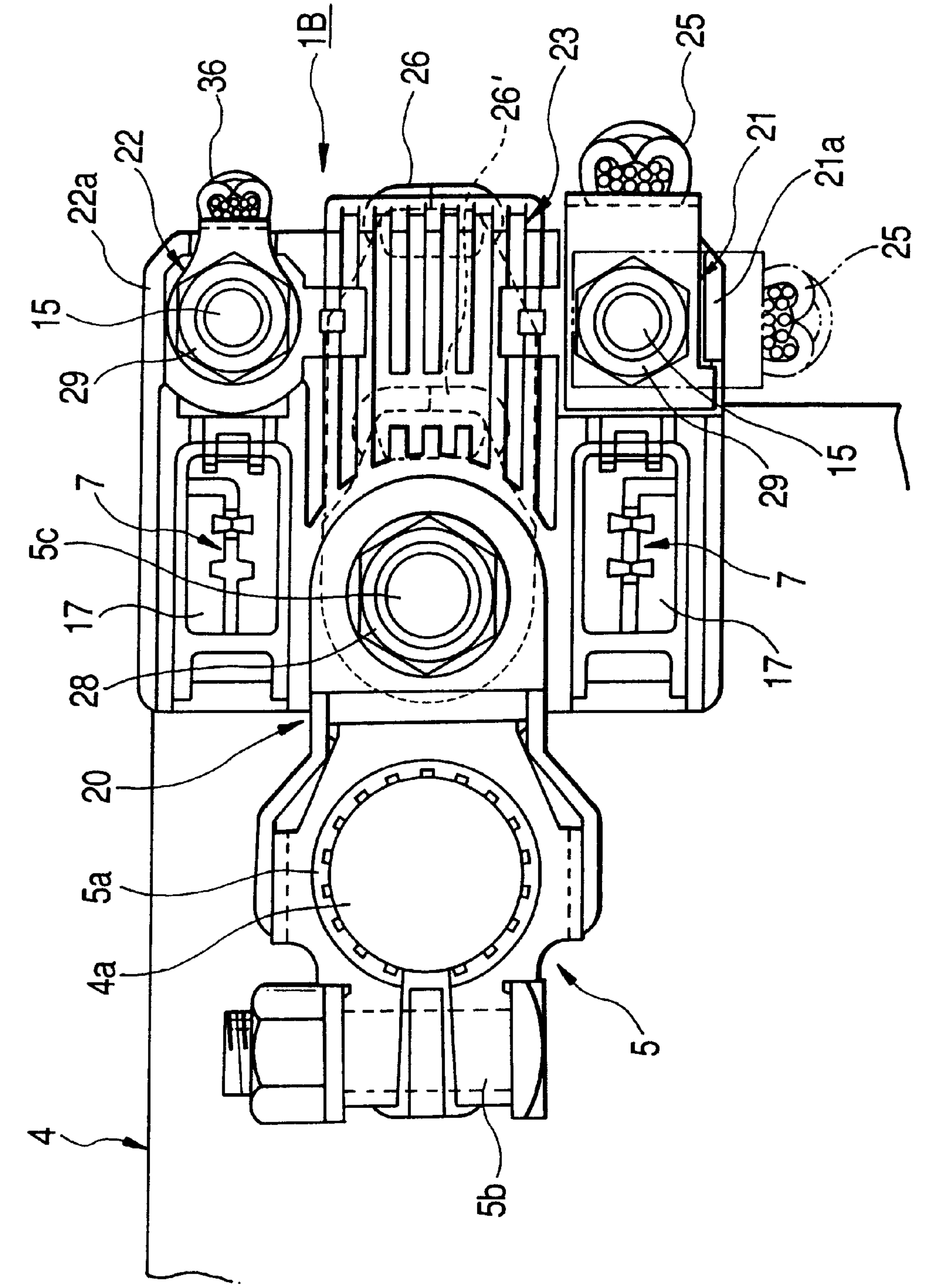
FIG. 12 is a perspective view illustrating a state wherein the large current fuse in FIG. 9 has been assembled to a battery by way of a power source side terminal, and a first terminal, a third terminal, and two co-clamping terminals have been connected thereto.
Figure 13:
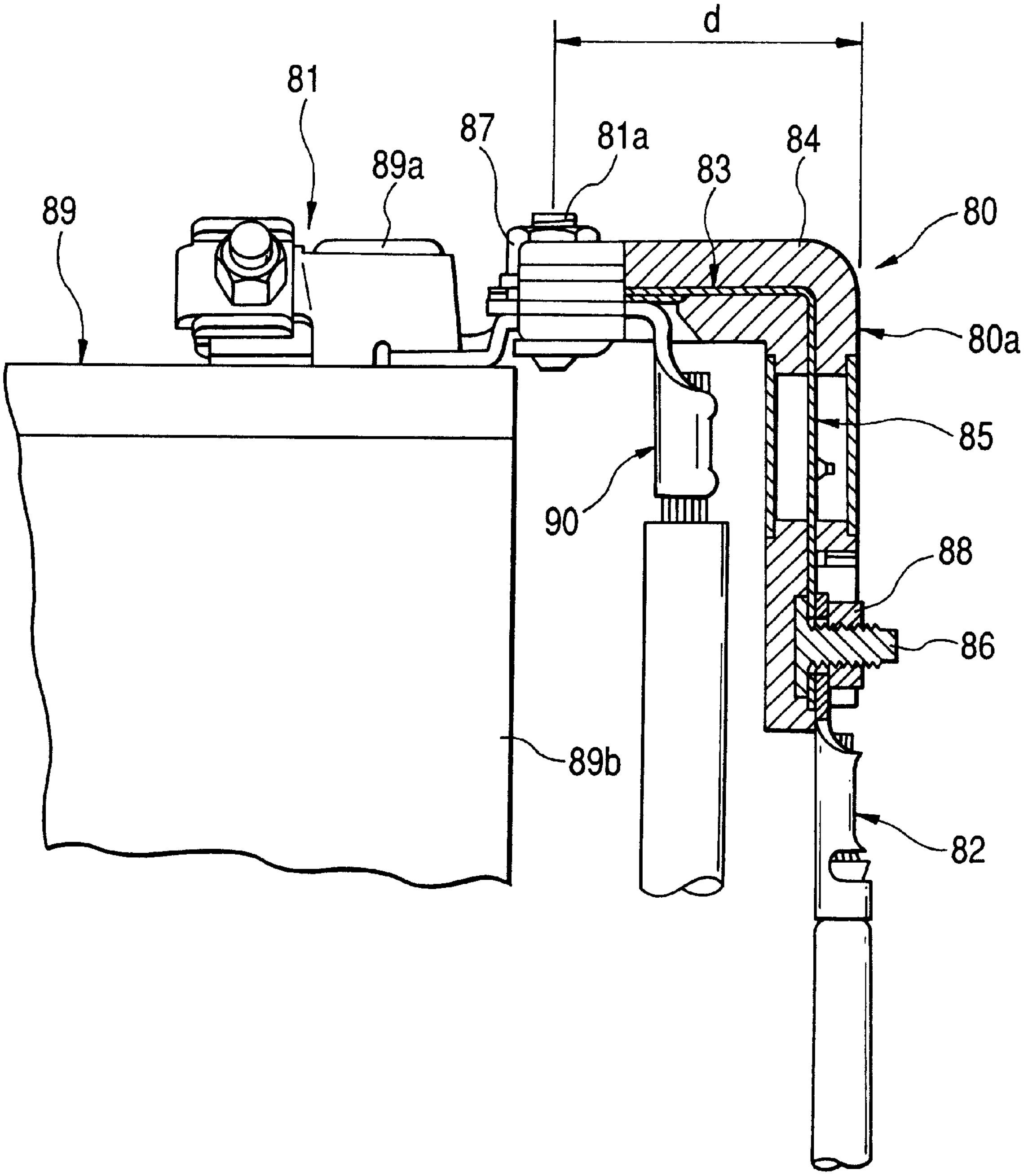
PRIOR ART FIG. 13
FIG. 13 is a side view of a conventional large current fuse partly in section.
Figure 14:
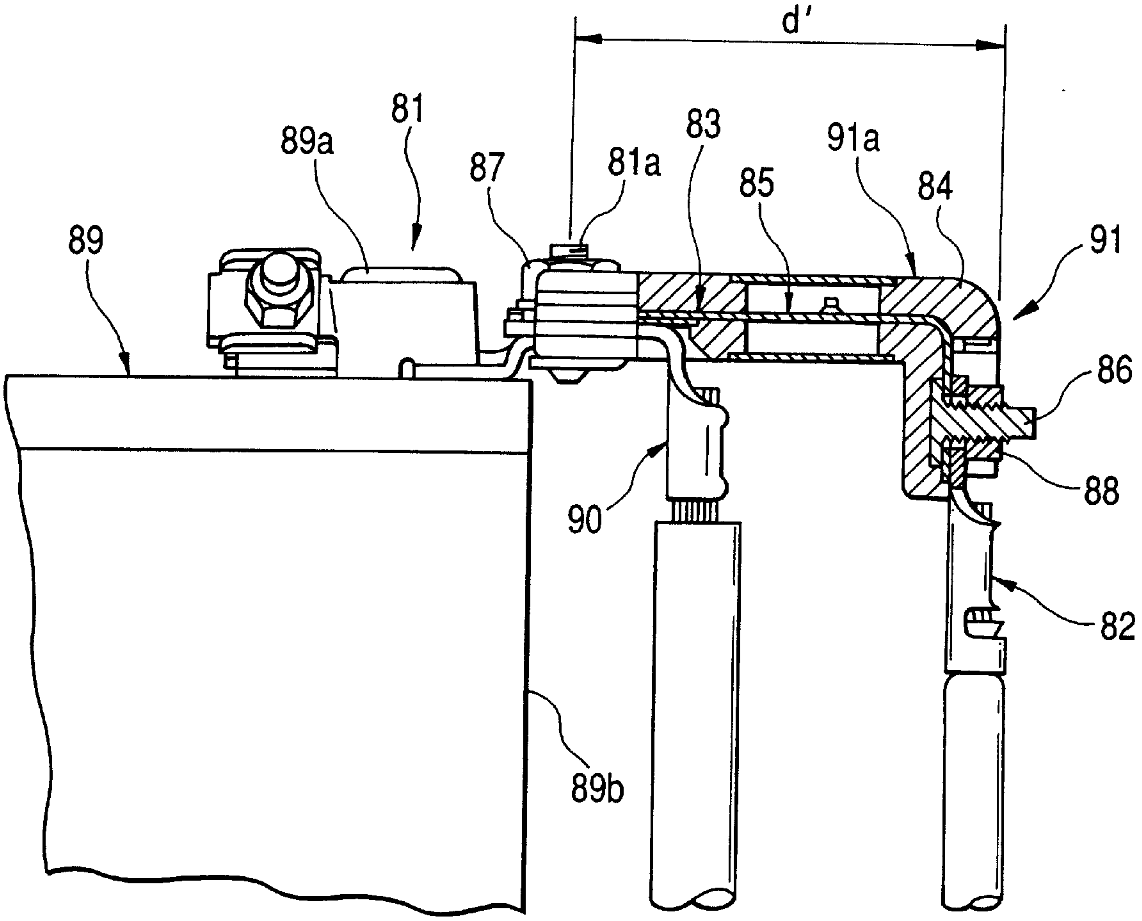
PRIOR ART FIG. 14
FIG. 14 is a side view of another conventional large current fuse partly in section.

As shown in FIGS. 9 and 12, the resin case 3B is provided with a first and a second positioning ribs 21*a,* 22*a* so as to project therefrom at the positions corresponding to the peripheries of the first terminal connecting part 21 and the second terminal connecting part 22, that is, the peripheries of the first connecting terminal plate 8 and the second connecting terminal plate 38. The second positioning rib 22*a* is uprightly provided in parallel to the above mentioned longitudinal direction. At least one of the first and second positioning ribs 21*a,* 22*a* can be positioned in a direction perpendicular to the longitudinal direction.

A manner of assembling the large current fuse 1B to the battery 4 is the same as in the first embodiment, and so, the explanation will be omitted.

Referring to FIG. 9, a manner of electrically connecting a first terminal 25, a second terminal 35, a third terminal 36 and a fourth terminal 37 to the large current fuse 1B will be described.

As seen in FIG. 9, the first terminal 25, the second terminal 35, the third terminal 36 and the fourth terminal 37 are respectively connected to end portions of a plurality of electric wires 30, 31, 30', 31' branched from the wire harness which is disposed in a vehicle (not shown).

As seen in FIG. 9 and FIG. 12, after the large current fuse 1B has been assembled to the battery 4 by way of the power source side terminal 5. The first terminal 25 is electrically connected to the first terminal connecting part 21 and the third terminal 36 to the third terminal connecting part 22 respectively in the same manner as in the first embodiment. Although the first terminal 25 is in a rectangular shape and the third terminal 36 is in a round shape in FIG. 9, they may be vice versa, or both of them may be in the same shape of either one of the above shapes.

Connection of the second terminal 35 and the fourth terminal 37 to the large current fuse 1B is conducted before the large current fuse 1B is assembled to the battery 4. In other words, respective connecting holes 35*a*, 37*a* of the second terminal 35 and the fourth terminal 37 is inserted into the power source side stud bolt 5*c* of the power source side terminal 5. When the power source side stud bolt 5*c* is inserted into the connecting hole 9 of the power source connecting part 20, both the second and the fourth terminals 35, 37 are interposed between the power source side terminal 5 and the large current fuse 1B in a sandwich shape. In this state, the power source side stud bolt 5*c* is screwed by a nut 28. Accordingly the second and the fourth terminals 35, 37 can be clamped together with the large current fuse 1B. The second terminal 35 and the fourth terminal 37 which are clamped together in two layers are directed opposite to each other. In short, the second terminal 35 is arranged at a side of the first terminal 25, while the fourth terminal 37 is arranged at a side of the third terminal 36. The first terminal 25 and the third terminal 36 are substantially perpendicular to an axial direction of the electric wire 30 (30'). The second terminal 35 and the fourth terminal 37 are substantially perpendicular to an axial direction of the electric wire 31 (31'), and are in a state where they are rotated by 90 degree around the axial direction of the electric wire 31 (31') on a plane perpendicular to the axial direction. This means that the second terminal 35 and the fourth terminal 37 are rotated by 90 degree from the first terminal 25 and the third terminal 36.

As shown in FIG. 12, the two co-clamping terminals 26, 26' can be clamped together to the power source connecting part 20 of the large current fuse 1B, while the connection of the first terminal 25 and the third terminal 36 are connected thereto. In both the first and the second embodiments, numeral 39 represents holes at which connecting pieces (not shown) have been formed at stamping a metal plate (not shown) in order to facilitate resin forming of the fuse body 2A (2B) and the connecting pieces have been removed after the stamping work.

The large current fuses 1A, 11 in the first and the second embodiments are a bolt-on type to be directly coupled to the battery post 4*a*, as shown in FIGS. 1 and 9. However, other types of application are also possible.

As described above, according to the invention, at least one side of both the longitudinal sides of the power supply terminal plate in a rectangular shape are integrally provided with at least one connecting terminal plate by way of the fusible member. The power supply terminal plate and the connecting terminal plate are arranged at the same side with respect to the extension line extending along the other end of the power supply terminal plate. Accordingly, when the large current fuse has been assembled to the battery by way of the power source side terminal, the distance of the large current fuse protruding from the battery can be shortened. This can prevent interference between the electric parts mounted around the battery and the large current fuse.

In addition, because the protruding distance can be thus shortened, the large current fuse can be reliably assembled to the battery, even in case where the mounting space in the vehicle in which the large current fuse is to be assembled to the battery is narrow.

According to the invention, the connecting terminal plate is disposed on the same plane as the power supply terminal plate, and has the stud bolt which projects in a direction opposite to the direction of mounting the power source side terminal on the battery post. Accordingly, the shape of the large current fuse can be made flat as compared with the general large current fuse. This means that when the terminals are clamped to the power source side terminal together with the power supply terminal plate, those restrictions due to the shape of the large current fuse can be abolished as compared with the conventional fuse. This can improve the degree of freedom of arranging (fixing) the terminals to be clamped together with the power supply terminal plate by means of the power source side terminal.

Further, even after the large current fuse has been assembled to the battery, the other terminals can be more easily connected than in the conventional example, since the stud bolt of the large current fuse projects upward. The connecting work of the other terminals to the large current fuse can be thus improved.

What is claimed is:

1. A large current fuse adapted to connect a power source side terminal, attached to a battery post of a battery, to at least one terminal, said fuse comprising:

a fuse body including:

a power supply terminal plate in substantially rectangular shape, one end of said power supply terminal plate being connectable to said power source side terminal; and at least one connecting terminal plate located in a direction perpendicular to a first direction with respect to said power supply terminal plate, said first direction defined by said fuse body elongating from said battery post; and at least one fusible member connecting said power supply terminal plate to said at least one connecting terminal plate, respectively;

wherein an imaginary line extends along the other end of said power supply terminal plate and is substantially perpendicular to said first direction, said at least one connecting terminal plate is positioned at a same side as said power supply terminal plate with respect to said imaginary line, and an outer peripheral edge of said connecting terminal plate is substantially along said imaginary line.

2. A large current fuse according to claim 1, wherein said at least one connecting terminal plate is positioned on a same plane as said power supply terminal plate.

3. A large current fuse according to claim 1, wherein at least one stud bolt is provided at said at least one connecting terminal plate respectively, and said at least one stud bolt projects in a direction opposite to a mounting direction of mounting said power supply terminal plate to said battery post.

4. A large current fuse according to claim 1, wherein said fusible member is formed in L-shape.

5. A large current fuse according to claim 1, wherein a resin body partially covers said fuse body.

6. The large current fuse according to claim 5, wherein a removable transparent cover is positioned on at least one of an upper and lower surface of said fusible member.

7. A large current fuse according to claim 5, wherein radiating fins is formed at said resin body.

8. A large current fuse adapted to electrically connect a power source side terminal, directly electrically attached to a battery, to at least one terminal, said fuse comprising:

A. a fuse body including:

a power supply terminal plate connectable to said power source side terminal;

at least one connecting terminal plate connectable to one of said at least one terminal; and at least one fusible member coupling said power supply terminal plate to said at least one connecting terminal plate respectively;

B. a resin cover partially covering said fuse body;

wherein said power supply terminal plate is substantially parallel to said at least one connecting terminal plate;

C. a power supply terminal hole provided at said power supply terminal plate for holding said power source side terminal; and D. at least one terminal hole respectively provided at said at least one connecting terminal plate;

wherein said at least one terminal hole is positioned between said power supply terminal hole and a distal end of said power supply terminal plate opposite to said power supply terminal hole side.

9. A large current fuse adapted to connect a power source side terminal, attached to a battery, to at least one terminal, said fuse comprising:

A. a fuse body including:

a power supply terminal plate connectable to said power source side terminal;

at least one connecting terminal plate connectable to one of said at least one terminal; and at least one fusible member coupling said power supply terminal plate to said at least one connecting terminal plate respectively, wherein a power supply terminal hole is provided at said power supply terminal plate for holding said power source side terminal and at least one terminal hole is respectively provided at said at least one connecting terminal plate, said at least one terminal hole being positioned between said power supply terminal hole and a distal end of said power supply terminal plate opposite to said power supply terminal hole side; and B. a resin cover partially covering said fuse body;

wherein said power supply terminal plate is substantially parallel to said at least one connecting terminal plate.

* * * * *